United States Patent [19]

Borgman et al.

[11] Patent Number: 5,085,172
[45] Date of Patent: Feb. 4, 1992

[54] DISCHARGE SYSTEM FOR MILK AND AN AUTOMATIC MILKING SYSTEM PROVIDED WITH SUCH A DISCHARGE SYSTEM

[75] Inventors: Fokko P. Borgman, Nieuw Vennep; Erik A. Aurik, Amsterdam; Jacobus P. Dessing, Cruquius, all of Netherlands

[73] Assignee: Multinorm B.V., Nieuw-Vennep, Netherlands

[21] Appl. No.: 533,077

[22] Filed: May 22, 1990

[30] Foreign Application Priority Data

May 26, 1989 [NL] Netherlands ................ 89.01339

[51] Int. Cl.$^5$ .............................. A01J 9/04
[52] U.S. Cl. ................ 119/14.09; 119/14.43; 119/14.46
[58] Field of Search .......... 119/14.08, 14.09, 14.17, 119/14.43, 14.46

[56] References Cited

U.S. PATENT DOCUMENTS

| 3,139,857 | 7/1964 | Merritt et al. ............... 119/14.46 |
| 3,187,719 | 6/1965 | Jones ........................... 119/14.46 X |
| 3,289,633 | 12/1966 | Simons ........................ 119/14.17 X |
| 3,538,768 | 11/1970 | Duncan ....................... 119/14.17 X |
| 4,095,920 | 6/1978 | Needham et al. ............. 417/12 |
| 4,612,537 | 9/1986 | Maltais et al. .............. 119/14.09 X |

FOREIGN PATENT DOCUMENTS

| 0213660 | 3/1987 | European Pat. Off. . |
| 0270165 | 6/1988 | European Pat. Off. . |
| 0277396 | 8/1988 | European Pat. Off. . |
| 2759126 | 7/1979 | Fed. Rep. of Germany . |
| 3440122 | 7/1986 | Fed. Rep. of Germany . |
| 2272595 | 12/1975 | France . |
| 8200748 | 3/1982 | PCT Int'l Appl. ............. 119/14.09 |

Primary Examiner—Robert P. Swiatek
Attorney, Agent, or Firm—Wegner, Cantor, Mueller & Player

[57] ABSTRACT

A system for discharging milk to a storage tank is provided with an intermediate reservoir for temporarily storing the milk and/or a cooled tank for collecting milk unsuitable for human consumption.

17 Claims, 1 Drawing Sheet

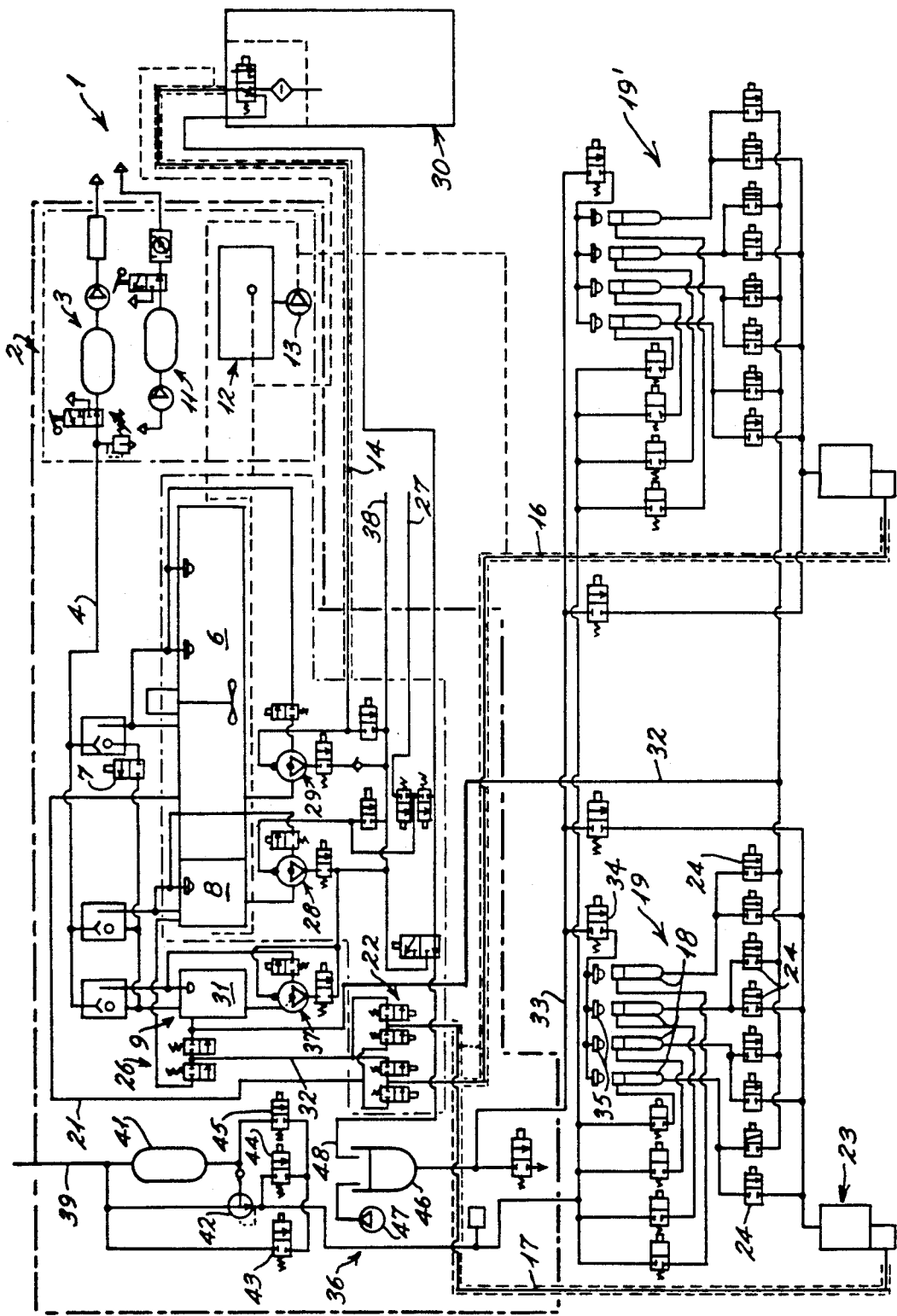

DISCHARGE SYSTEM FOR MILK AND AN AUTOMATIC MILKING SYSTEM PROVIDED WITH SUCH A DISCHARGE SYSTEM

With known milking systems a herd of animals, usually cows, is milked successively one by one and the milk is carried from milking cups via a valve system to a milk storage tank, which tank is usually cooled and emptied weekly, for example. After all the animals of a herd have been milked, the milking cups and the valve system are washed with hot or cold water, with or without cleaning agent.

The present invention has for its object to improve such a known discharge system for milk such that cleaning of the complete conduit system and the valves can be avoided.

The present invention provides a system as claimed in claim 1.

The discharge system according to the present invention is preferably used with an automatic milking system as described in EP-A 86.201.338.0, 86.202.380.1, 87.202.659.6 and 89.200.035.7 in the name of the same applicant, the contents of which should be deemed as interpolated herein. With a like or other automatic milking system the animals are milked in accordance with their own requirement at times chosen by them, in order to enlarge the milk yield and/or improve the animal's peace of mind.

The present invention provides in addition a discharge system provided with a cooled tank for collecting and storing milk unsuitable for human consumption, which is nevertheless often suitable for feeding to calves and/or for the dairy industry.

The present invention will be elucidated on the basis of an embodiment thereof which is described with reference to a schematic drawing.

A system for discharging milk 1 is preferably arranged in a frame L-shaped in top view so that this system occupies as little space as possible in a corner of for instance a container as described in EP-A-87.202.659.6.

In the subsequent description only those components from the figure are indicated which are necessary for an understanding of the present invention; the symbols of the diagram are self-explanatory to a person skilled in the art in this field.

Disposed in a sub-frame 2 is a vacuum system 3 that serves to generate vacuum in the milking cups. This vacuum system is connected via a line 4 to an intermediate reservoir 6 as well as via a switch 7 to a tank 8 and a cold washing system 9. A compressed air unit 11 is further arranged in the sub-frame 2 to generate compressed air for operating components of an automatic milking system. Also arranged in the sub-frame 2 is a cooling unit 12 making use for instance of cold water that is circulated by a pump 13 via the conduits indicated with broken lines to a cooling for the tanks 6 and 8 as well as for conduits 14, 16 and 17, the function of which will be described hereinafter.

During milking via milking cups 18 of milking set 19 milk is taken from an animal on which the milking cups 18 are arranged and carried via conduit 21 and switching unit 22 via cooled conduit 17, milk quantity meter 23 and switches 24 to the intermediate reservoir 6, which reservoir has a sufficient capacity—for example 185 1—to collect milk during a number of hours of continuous milking.

If the milk discharged from the milking cups 18 is unsuitable for human consumption, for instance milk originating from a cow infected with mastitis or beestings, by applying vacuum to tank 8 via the switch 7 this milk can be guided via the switching unit 22 and the switching unit 26 into this tank 8. Arranged in the shown preferred embodiment of the system 1 for discharging milk unsuitable for human consumption from tank 8 to discharge conduit 27 is a pump unit 28 which provides for this discharge via switching means (not further shown).

A pump unit 29 - likewise provided with switching means - is arranged for discharging the milk from intermediate reservoir 6, which pump unit is connected to the cooled conduit 14 to the usually cooled storage tank 30.

When washing using a washing unit 9 the vacuum system 3 is coupled to a tank 31, for instance with a capacity of 20 liters, and this is filled from a cleaning unit 36 with for instance cold or lukewarm water via conduit 32, switches 24, via washing elements 35, milking cups 18, switches 34 and conduit 33. The contents of tank 31 can be discharged via pump unit 37 to a sewer pipe 38 or be re-used for circulatory washing of the milking cups 18.

The cleaning unit 36 is per se known from the state of the art and comprises a feed conduit 39 for cold water, a boiler unit 41, a thermostat element 42 in addition to switches 43, 44, 45 as well as a washing vessel 46, and in addition a pump 47 and a conduit 48 are connected to the storage tank 31.

By switching the relevant switches, water of a predetermined temperature, optionally supplied with cleaning agent, can, using the cleaning unit 36, be used to clean both the non-cooled and the cooled parts of the system, that is, the tanks 6, 8 and 30, as well as the milking cups 18 and the switches belonging thereto.

Also designated in the figure is a milking set 19' which is connected in a corresponding manner to the washing system 1 according to the present invention and which can be washed separately, as can be seen from the circuit indicated in the figure.

The embodiment according to the present invention can be provided in a manner not shown with measuring units for checking for instance the amount of liquid flowing through particular conduits, the quality of the milk and the like, in order to safeguard the operation of the shown preferred embodiment 1 of the system.

The valves or switches shown in the figure will usually be remotely controllable from a control unit such as a personal computer, but the present invention does not exclude manual operation of particular closing devices, valves or switches either at their location or from a distance.

We claim:

1. In a system for discharging milk including at least one milking cup and a milk storage tank, the improvement comprising:
   an intermediate reservoir;
   collection tank means for storing milk unsuitable for human consumption;
   switching means for switching milk from said at least one milking cup and selectively routing the milk to a destination of either said intermediate reservoir or said collection tank means;
   first means for conducting milk from said at least one milking cup to said switching means;

second means for conducting milk from said switching means to said intermediate reservoir and said collection tank means;

and third means for conducting milk from said intermediate reservoir to said milk storage tank.

2. A system as recited in claim 1, further comprising cooling means for cooling said intermediate reservoir.

3. A system as recited in claim 2, wherein said cooling means includes means for cooling said collection tank means.

4. A system as recited in claim 1, further comprising a washing unit including means for conducting washing liquid through said at least one milking cup.

5. A system as recited in claim 4, wherein said means for conducting washing liquid includes a washing liquid storage tank, and means for transporting the washing liquid from said washing liquid storage tank to said at least one milking cup.

6. A system as recited in claim 4, wherein said washing unit further includes means for conducting washing liquid through said milk storage tank, said intermediate reservoir and said collection tank means.

7. A system as recited in claim 4, further comprising vacuum generating means for forcing the washing liquid through said means for conducting washing liquid and forcing milk from said at least one milking cup.

8. A system as recited in claim 1, wherein said second means for conducting milk includes a vacuum generating system connected to said intermediate reservoir and said collection tank means.

9. A system as recited in claim 1, further comprising discharge means for discharging the milk unsuitable for human consumption from said collection tank means.

10. A system as recited in claim 1, wherein said first means for conducting milk includes a cooled conduit.

11. A system as recited in claim 1, further comprising a milk quantity meter connected to said first means for conducting milk.

12. A system as recited in claim 1, wherein said third means for conducting milk includes a cooled conduit.

13. In a milk discharge system including at least one milking cup and a milk storage tank, the improvement comprising:

an intermediate reservoir for collecting milk;

means for conducting milk from the at least one milking cup to the intermediate reservoir;

means for conducting milk from the intermediate reservoir to the milk storage tank;

vacuum means for generating a vacuum;

a washing liquid storage tank;

a cleaning element for applying washing liquid to each said milking cup;

means for conducting washing liquid from the washing liquid storage tank to each said cleaning element; and means for selectively connecting the vacuum means to the intermediate reservoir and the washing liquid storage tank for selectively performing milk collection or washing.

14. A system as recited in claim 13, further comprising means for conducting washing liquid from the washing liquid storage tank through the intermediate reservoir.

15. A system as recited in claim 13, further comprising:

a collection tank for storing milk unsuitable for human consumption;

means for conducting milk from the at least one milking cup to the collection tank;

switching means for selectively routing milk from said at least one milking cup either through said means for conducting milk from the at least one milking cup to the intermediate reservoir or through said means for conducting milk from the at least one milking cup to the collection tank; and means for conducting milk from said at least one milking cup to said switching means.

16. A system as recited in claim 15, further comprising means for conducting washing liquid from the washing liquid storage tank through the collection tank.

17. A system as recited in claim 13, further comprising a cleaning unit connected to said washing liquid storage tank for conducting cleaning agent thereto.

* * * * *